(12) United States Patent
Li et al.

(10) Patent No.: US 12,629,830 B2
(45) Date of Patent: May 19, 2026

(54) METHOD AND APPARATUS FOR TUNING ROBOT PATH FOR PROCESSING WORKPIECE

(71) Applicant: ABB Schweiz AG, Baden (CH)

(72) Inventors: Zhongyu Li, Shanghai (CN); Lei Mao, Shanghai (CN); Wenyao Shao, Shanghai (CN)

(73) Assignee: ABB Schweiz AG, Baden (CH)

( * ) Notice: Subject to any disclaimer, the term of this patent is extended or adjusted under 35 U.S.C. 154(b) by 123 days.

(21) Appl. No.: 18/262,280

(22) PCT Filed: Feb. 10, 2021

(86) PCT No.: PCT/CN2021/076558
§ 371 (c)(1),
(2) Date: Jul. 20, 2023

(87) PCT Pub. No.: WO2022/170572
PCT Pub. Date: Aug. 18, 2022

(65) Prior Publication Data
US 2024/0075618 A1     Mar. 7, 2024

(51) Int. Cl.
*B25J 9/16*          (2006.01)
*B25J 11/00*         (2006.01)
(52) U.S. Cl.
CPC ........... *B25J 9/1664* (2013.01); *B25J 9/1653* (2013.01); *B25J 11/005* (2013.01)
(58) Field of Classification Search
CPC ...... B25J 9/1664; B25J 9/1653; B25J 11/005; G05B 2219/39451; G05B 2219/39449
See application file for complete search history.

(56) References Cited

U.S. PATENT DOCUMENTS 6,167,328 A * 12/2000 Takaoka ................. B25J 9/1671
                                                      700/250
6,552,722 B1 * 4/2003 Shih ..................... G06F 3/03545
                                                      345/419
(Continued)

FOREIGN PATENT DOCUMENTS

CN      1957374 A      5/2007
DE    102018201589 A1  8/2019
WO     2017198299 A1   11/2017

OTHER PUBLICATIONS

Fang et al., "A novel augmented reality-based interface for robot path planning", Int J Interact Des Manuf (2014) 8:33-42; 10 pages.

*Primary Examiner* — Stephen Holwerda
(74) *Attorney, Agent, or Firm* — Greenberg Traurig, LLP

(57)          ABSTRACT

An apparatus, a system, and a method for tuning a robot path for processing a workpiece. The method includes overlapping a visual representation of the robot path on a visual presentation of the workpiece. The visual presentation of the robot path includes at least one virtual point that corresponds to at least one controlling point in the robot path. The method further includes in response to receiving a user input for moving a virtual point in the at least one virtual point relative to the visual presentation of the workpiece, detecting an updated position of the virtual point caused by the user input; and tuning the robot path based on the updated position of the virtual point.

21 Claims, 3 Drawing Sheets

(56)                    References Cited

U.S. PATENT DOCUMENTS

| | | | |
|---|---|---|---|
| 2004/0172168 A1* | 9/2004 | Watanabe | G05B 19/425 |
| | | | 700/264 |
| 2004/0189631 A1* | 9/2004 | Kazi | G06T 19/006 |
| | | | 345/418 |
| 2008/0150965 A1 | 6/2008 | Bischoff et al. | |
| 2011/0172818 A1* | 7/2011 | Kim | B25J 9/1666 |
| | | | 901/2 |
| 2014/0277737 A1 | 9/2014 | Sekiyama et al. | |
| 2016/0151913 A1* | 6/2016 | Nagatsuka | B25J 9/1664 |
| | | | 700/254 |
| 2017/0364076 A1* | 12/2017 | Keshmiri | G05B 19/41 |
| 2017/0372139 A1* | 12/2017 | Thomasson | G06V 20/20 |
| 2019/0054617 A1* | 2/2019 | Huang | B25J 9/1697 |
| 2019/0389066 A1* | 12/2019 | Jung | B25J 9/1661 |
| 2021/0200219 A1* | 7/2021 | Gaschler | G05D 1/0274 |

* cited by examiner

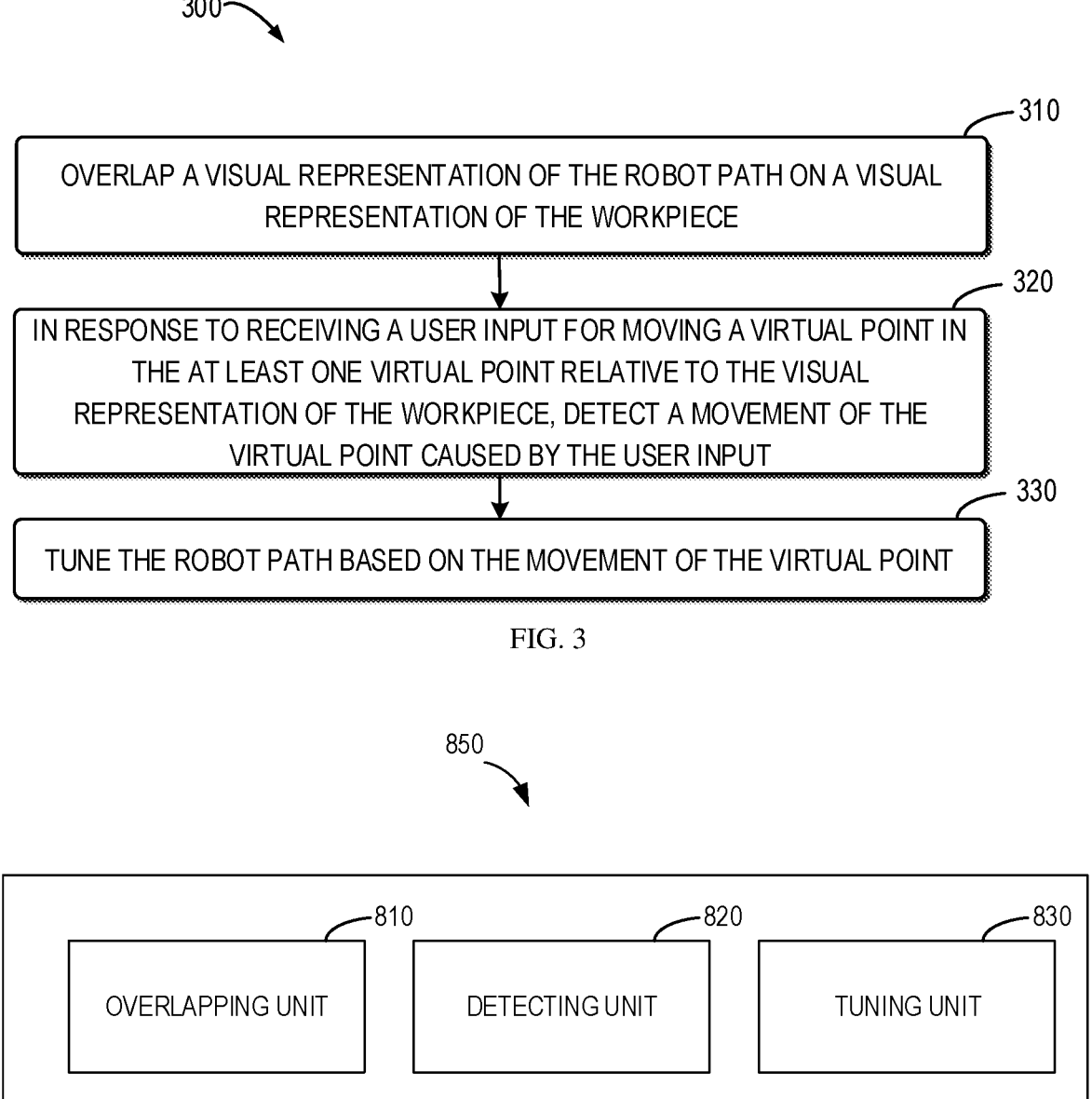

300

310
OVERLAP A VISUAL REPRESENTATION OF THE ROBOT PATH ON A VISUAL REPRESENTATION OF THE WORKPIECE

320
IN RESPONSE TO RECEIVING A USER INPUT FOR MOVING A VIRTUAL POINT IN THE AT LEAST ONE VIRTUAL POINT RELATIVE TO THE VISUAL REPRESENTATION OF THE WORKPIECE, DETECT A MOVEMENT OF THE VIRTUAL POINT CAUSED BY THE USER INPUT

330
TUNE THE ROBOT PATH BASED ON THE MOVEMENT OF THE VIRTUAL POINT

810
OVERLAPPING UNIT

820
DETECTING UNIT

830
TUNING UNIT

FIG. 4

METHOD AND APPARATUS FOR TUNING ROBOT PATH FOR PROCESSING WORKPIECE

CROSS-REFERENCE TO RELATED APPLICATIONS

This is a national stage application claiming priority to International patent application Serial No.: PCT/CN2021/076558, filed on Feb. 10, 2021; which is herein incorporated by reference in its entirety.

FIELD

Embodiments of the present disclosure generally relate to an apparatus and a method for tuning a robot path for processing a workpiece.

BACKGROUND

The traditional machining process is usually performed by humans manually operating machine tools such as lathes, grinders, etc. The traditional machining process is usually accompanied by high pollution, e.g., noise and emissions, and also causes damage to the human body. With the continuous development of the robotics industry, more and more machining processes have begun to be automatically performed by a robot system such as a robot or a CNC machine tool.

Before using a robot system to machine a workpiece, it is usually necessary to use computer-aided design (CAD) and/or computer-aided manufacturing (CAM) applications to generate instructions that can embody machining processes according to the 3D model of the workpiece to be processed. The instructions can then be executed by a controller of a robot system to cause the robot to perform the machining process along a robot path.

SUMMARY

Embodiments of the present disclosure provide an apparatus and a method for tuning a robot path for processing a workpiece.

In a first aspect, a method of turning a robot path for processing a workpiece is provided. The method comprises overlapping a visual representation of the robot path on a visual representation of the workpiece, the visual representation of the robot path comprising at least one virtual point that corresponds to at least one controlling point in the robot path; in response to receiving a user input for moving a virtual point in the at least one virtual point relative to the visual representation of the workpiece, detecting an updated position of the virtual point caused by the user input; and tuning the robot path based on the updated position of the virtual point.

With the method according to embodiments of the present disclosure, it is easier and more intuitive for an operator such as an on-site engineer to tune the robot path for processing the workpiece. In this way, the tuning efficiency and thus the machining efficiency can be enhanced and the machining quality can also be significantly improved.

In some embodiments, overlapping the visual representation of the robot path on the visual representation of the workpiece comprises: identifying a reference feature for the robot path and a corresponding reference feature for the visual representation of the workpiece, respectively; and aligning the visual represent of the robot path and the visual representation of the workpiece based on the reference feature and the corresponding reference feature. In this way, the robot path can be tuned more intuitively.

In some embodiments, the reference feature comprises an orientation of the visual representation of the robot path, and the corresponding reference feature comprises an orientation of the visual representation of the workpiece. This arrangement may ensure that the visual representations of the robot path and the workpiece are aligned with each other in terms the orientation. As a result, it is easier for the operator to adjust the robot path in the orientation of interest.

In some embodiments, the tuning the robot path comprises: determining an updated position of the virtual point; obtaining an updated position of a controlling point, in the at least one controlling point, that corresponds to the virtual point; and tuning the robot path based on the updated position of the controlling point. In this way, the robot path can be easily tuned based on the visual representation of the robot path.

In some embodiments, the method further comprises: in response to detecting the user input for moving the virtual point in the at least one virtual point, highlighting the virtual point; and providing a virtual tool for moving the virtual point according to any of a moving distance and a direction of the virtual point. This is conducive to more intuitive adjustment of virtual points.

In some embodiments, the method further comprises: in response to detecting a change in any of a position and an orientation of the visual representation of the workpiece, adjusting the visual representation of the robot path based on the detected change. As a result, it is easier for the operator to adjust the robot path in the orientation of interest.

In some embodiments, determining the updated position of the virtual point comprises any of: in response to a moving distance of the virtual point being within a threshold range, confirming the updated position; and in response to the distance exceeding the threshold range, rejecting the updated position. This can further improve the machining accuracy while preventing possible overcut, collision or interference.

In some embodiments, determining the updated position of the virtual point comprises: determining, from a moving operation of the user input, a moving speed at which the virtual point is to be moved; and determining the updated position of the virtual point based on the moving speed; and wherein the method further comprises: updating the visual representation of the robot path based on the updated position of the virtual point. In this way, it can allow more precise adjustment of the position of the virtual point.

In some embodiments, determining the updated position of the virtual point comprises: determining, from an input operation of at least one parameter in a parameter panel, the updated position of the virtual point, and the at least one parameter comprising any of: coordinate values of the virtual point; and a minimum distance between the virtual point and the visual representation of the workpiece.

In some embodiments, the visual representation of the robot path comprises a visual representation that is displayed on any of a monitor and an augmented reality displayer; and wherein the visual representation of the workpiece comprises any of an image of the workpiece displayed on the monitor and an image of the workpiece observed through the augmented reality displayer. This allows the method to be performed more flexibly on devices such as an AR device.

In some embodiments, the method further comprises: instructing the robot system to process the workpiece by the tuned robot path. In this way, the tuned robot path can be easily employed to process the workpiece.

In a second aspect of the present disclosure, the apparatus for tuning a robot path for processing a workpiece is provided. The apparatus comprises a displaying unit adapted to at least display a visual representation of the robot path; and a computing unit comprising an overlapping unit adapted to overlap the visual representation of the robot path on a visual representation of the workpiece, the visual representation of the robot path comprising at least one virtual point that corresponds to at least one controlling point in the robot path; a detecting unit adapted to, in response to receiving a user input for moving a virtual point in the at least one virtual point relative to the visual representation of the workpiece, detect an updated position of the virtual point caused by the user input; and a tuning unit adapted to tune the robot path based on the updated position of the virtual point.

In some embodiments, the overlapping unit comprises: an identifying unit adapted to identify a reference feature for the robot path and a corresponding reference feature for the visual representation of the workpiece, respectively; and an aligning unit adapted to align the visual representation of the robot path and the visual representation of the workpiece based on the reference feature and the corresponding reference feature.

In some embodiments, the reference feature comprises an orientation of the visual representation of the robot path, and the corresponding reference feature comprises an orientation of the visual representation of the workpiece.

In some embodiments, the tuning unit comprises: a determining unit adapted to determine an updated position of the virtual point; and an obtaining unit adapted to obtain an updated position of a controlling point, in the at least one controlling point, that corresponds to the virtual point to tune the robot path based on the updated position of the controlling point.

In some embodiments, the apparatus further comprises a highlighting unit adapted to, in response to detecting the user input for moving the virtual point in the at least one virtual point, highlight the virtual point; and a virtual tool unit adapted to provide a virtual tool for moving the virtual point according to any of a moving distance and a direction of the virtual point.

In some embodiments, the apparatus further comprises an adjusting unit adapted to, in response to detecting a change in any of a position and an orientation of the visual representation of the workpiece, adjust the visual representation of the robot path based on the detected change.

In some embodiments, the determining unit is configured to: in response to a moving distance of the virtual point being within a threshold range, confirm the updated position; and in response to the distance exceeding the threshold range, reject the updated position.

In some embodiments, the determining unit is further configured to: determine, from a moving operation of the user input, a moving speed at which the virtual point is to be moved; and determine the updated position of the virtual point based on the moving speed; and wherein the apparatus further comprises an updated unit adapted to update the visual representation of the robot path based on the updated position of the virtual point.

In some embodiments, the determining unit is further configured to determine, from an input operation of at least one parameter in a parameter panel, the updated position of the virtual point, and the at least one parameter comprising any of: coordinate values of the virtual point; and a minimum distance between the virtual point and the visual representation of the workpiece.

In some embodiments, the visual representation of the robot path comprises a visual representation that is displayed on any of a monitor and an augmented reality displayer; and wherein the visual representation of the workpiece comprises any of an image of the workpiece displayed on the monitor and an image of the workpiece observed through the augmented reality displayer.

In some embodiments, the apparatus further comprises an instructing unit adapted to instruct the robot system to process the workpiece by the tuned robot path.

In a third aspect of the present disclosure, a computer readable medium is provided. The computer readable medium having instructions stored thereon, the instructions, when executed on at least one processor, cause the at least one processor to perform the method according to the first aspect as mentioned above.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

The above and other objectives, features and advantages of the present disclosure will become more apparent through more detailed depiction of example embodiments of the present disclosure in conjunction with the accompanying drawings, wherein in the example embodiments of the present disclosure, same reference numerals usually represent the same components.

FIG. 3 shows a flowchart illustrating a method of assembling a flexible ring-shaped workpiece according to embodiments of the present disclosure; and FIG. 4 illustrates a schematic diagram of an apparatus for tuning a robot path for processing a workpiece in accordance with embodiments of the present disclosure.

Throughout the drawings, the same or similar reference symbols are used to indicate the same or similar elements.

DETAILED DESCRIPTION

The present disclosure will now be discussed with reference to several example embodiments. It is to be understood these embodiments are discussed only for the purpose of enabling those skilled persons in the art to better understand and thus implement the present disclosure, rather than suggesting any limitations on the scope of the subject matter.

As used herein, the term "comprises" and its variants are to be read as open terms that mean "comprises, but is not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be comprised below. A definition of a term is consistent throughout the description unless the context clearly indicates otherwise.

Using a robot system such as a robot or a CNC machine tool to machine workpieces has advantages of high efficiency, high precision and small errors. For some complicated workpieces, in order to ensure accuracy, their machining processes are typically achieved by a robot system. Before machining processes are achieved by a robot system, it is necessary to use CAD and/or CAM software to generate instructions that can embody the machining process according to a 3D model of the workpiece. With the instructions that can be read by a controller of the robot system, the robot system can then automatically machine the workpiece following the machining process. The machining process may involve information about a robot path along which a machining tool, such as a grinding head, travels during the machining. That is, the instructions can be executed by the controller of the robot system to cause the machining tool held by the robot system to perform the machining process along the robot path. Besides the robot path, the machining process may also involve information such as a radius and/or a shape of the tool and the amount of feed.

One of the problems brought about by the above mentioned approach is that there may be deviations between the 3D model and the actual shape of the workpiece, so the generated instructions that embody the machining process will also have deviations. These deviations will eventually lead to greater errors and even machining failures. In this case, an operator needs to repeatedly adjust the machining process and/or instructions until the machining meets the error requirements. These adjustments are time-consuming, laborious and unintuitive, and it is easy to cause greater errors.

In order to at least partially address the above and other potential problems, embodiments of the present disclosure provide an apparatus and a method for tuning a robot path for processing a workpiece. Now some example embodiments will be described with reference to FIGS. 1-4.

Figure 1:
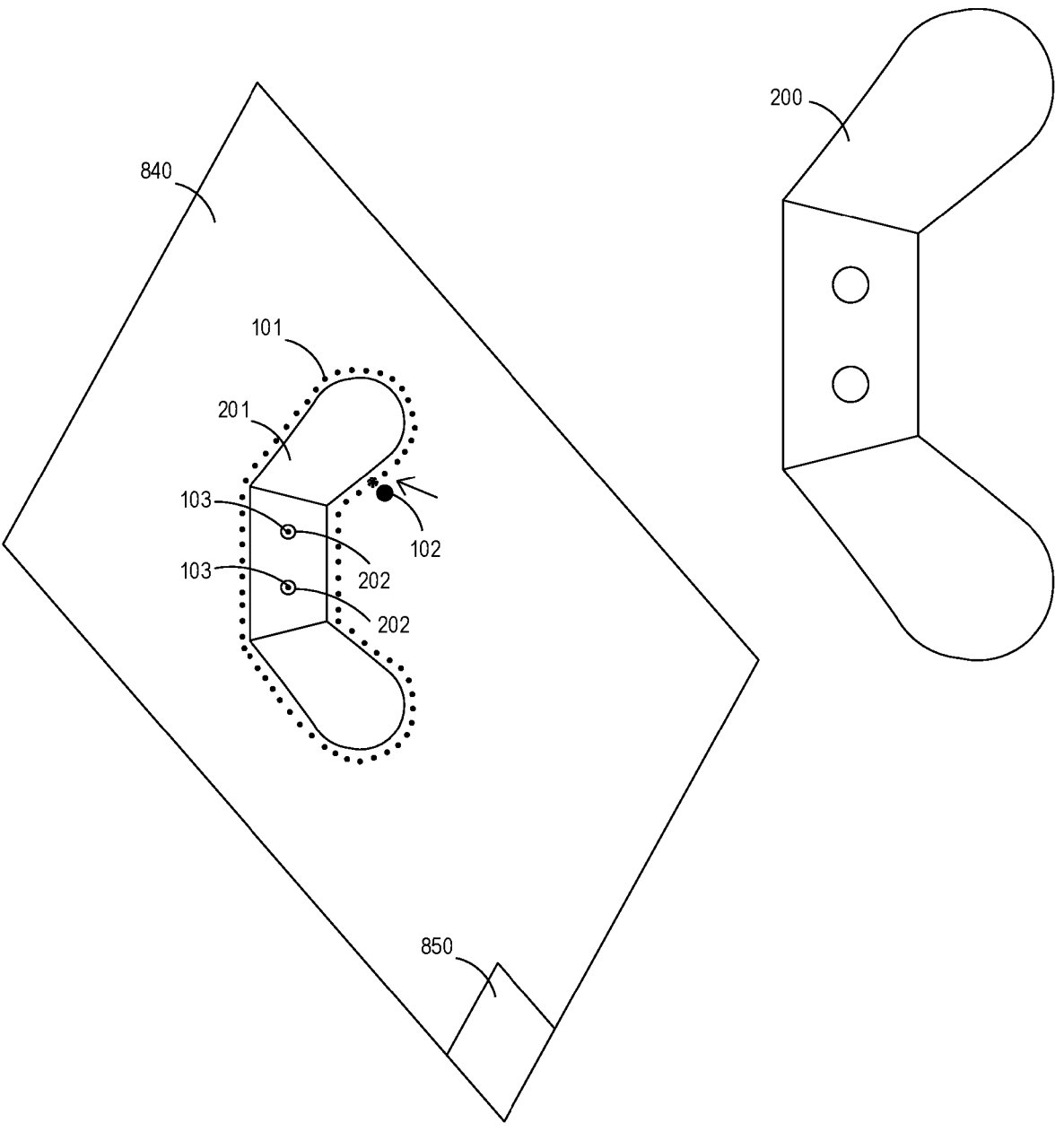
FIG. 1 shows a simplified diagram of tuning a robot path using an apparatus according to embodiments of the present disclosure.
Figure 2:
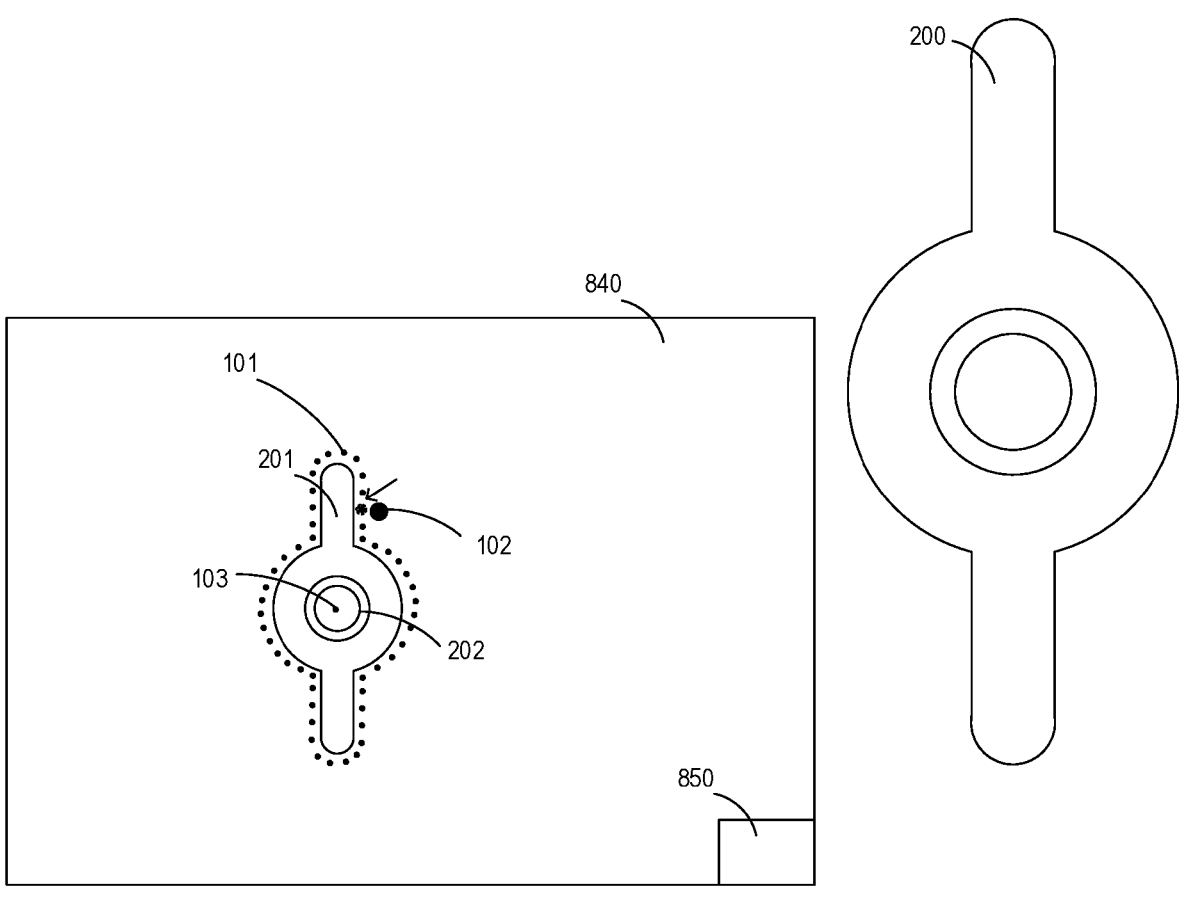
FIG. 2 shows a simplified diagram of tuning a robot path using an apparatus according to embodiments of the present disclosure.

FIGS. 1 and 2 show a simplified diagram of tuning a robot path using an apparatus 800 according to embodiments of the present disclosure. As shown, generally, the apparatus 800 comprises a displaying unit 840 and a computing assembly 850. The displaying unit 840 is used to at least display a visual representation 101 of the robot path. The visual representation 101 of the robot path comprises at least one virtual point that corresponds to at least one controlling point in the robot path. In some embodiments, the at least one controlling point may be generated according to the 3D model of the workpiece 200 and information about a machining tool such as a grinding head to be used to process the workpiece 200. For example, in some embodiments, the at least one virtual point corresponding to at least one controlling point may represent positions of a geometric center of the grinding head during the machining process. Alternatively, in some embodiments, the at least one virtual point may also be boundary points of the workpiece 200. Furthermore, in some alternative embodiments, the at least one controlling point may also be generated by analyzing the instructions to be executed by the controller to perform the machining process.

In some embodiments, the displaying unit 840 may comprise an augmented reality displayer such as a transparent displayer medium, for example, glasses to be worn by a user. While the visual representation 101 of the robot path is displayed on the augmented reality displayer, the operator can also directly observe a visual representation 201 of the workpiece 200 to be processed directly through the augmented reality displayer, with the visual representation 101 of the robot path overlapping on the visual representation 201 of the workpiece 200. That is, contrary to the conventional solutions, the visual representation 201 of the workpiece 200 belongs to a real-time representation of the workpiece 200. The robot path can be tuned based on the real-time representation of the workpiece 200. In this way, the robot path for processing the workpiece 200 can be displayed and tuned more intuitively. In addition to being worn on the operator as an AR device, the augmented reality displayer may also be placed near the machine tool so that the operator can directly observe the workpiece 200 placed on the machine tool through it.

In some alternative embodiments, the displaying unit 840 may be a displayer or a monitor understood in a usual sense, which typically has conventional display means such as LED or LCD, or the like. For example, the displayer may be arranged nearby a machine tool and the workpiece 200 as well. In this case, a camera to acquire an image, i.e., a real-time image, of the workpiece 200 may be provided. The displayer can display the real-time images acquired by the camera, while displaying the visual representation 101 of the robot path, which are overlapped on the visual representation 201 of the workpiece 200.

Furthermore, the displayer or the monitor may also be a screen of a mobile computing device such as a mobile phone. For example, the method may be embodied by an application stored in the mobile phone. After an operator runs the application, the operator can use a camera of the mobile phone to acquire the real-time image of the workpiece and adjust the robot path using real fingers through the virtual scene in the application.

That is, the visual representation 201 of the workpiece 200 may be either a real-time image acquired by a camera or an image observed directly through an augmented reality displayer. Embodiments of the present application will be discussed further by taking the visual representation 201 of the workpiece 200 being the real-time image as an example. The embodiments where the visual representation 201 of the workpiece 200 is directly observed through the augmented reality displayer are similar and will not be described separately in the following.

In some embodiments, the computing assembly 850 for executing the instructions may be a controller of a robot system such as a CNC machine tool or a robot, to allow the machining tool hold by the CNC machine tool or the robot to perform the machining process based on the robot path. In some embodiments, the displaying unit 840 may be provided for example by an augmented reality (AR) device as a part of the robot system. In this event, the apparatus 800 is the robot system comprising the CNC machine tool or a robot and the AR device. In this way, the apparatus 800 is more integrated and easier to control. Furthermore, in some embodiments, instead of the AR device, the displaying unit 840 may also comprise only a conventional monitor.

In some alternative embodiments, the computing assembly 850 may also be a controller separated from but electrically coupled to the controller of the CNC machine tool or a robot. For example, in some embodiments, the apparatus 800 for tuning the machining process of the workpiece 200 may be an AR device and the computing assembly 850 is a controller of the AR device. In this event, the apparatus 800 may further comprise a coupling unit. The coupling unit may be coupled to a robot system to instruct the robot system to process the workpiece 200 along the tuned robot path.

According to other aspects of the present disclosure, a method 300 of tuning the robot path for processing a workpiece 200 is provided. FIG. 3 shows a flowchart illustrating a method of tuning the robot path according to embodiments of the present disclosure. The method can be implemented as program codes stored in a memory, which can be performed by the computing assembly 850 of the apparatus 800 as mentioned above or any other suitable controller or processor.

In some alternative embodiments, the apparatus 800 may be a part of the robot system. In this case, the AR device acts as the displaying unit 840 as mentioned above.

The apparatus 800 and the method 300 according to embodiments of the present disclosure can be applied to tune the robot path for processing a workpiece 200 before or during the machining process. That is, in addition to using this method to tune the robot path before machining, the method can also be used during machining. When used in the machining process, this method can be used to tune at least one virtual point corresponding to at least one controlling point in the robot path that has not been performed. In the following, more details and possible variations of the apparatus 800 and the method will be described by taking the tuning of the robot path performed before the machining of a workpiece 200 as an example. Embodiments, where the robot path is tuned during the machining, are similar, and will not be described separately in the following.

When tuning the robot path for processing a workpiece 200, as shown in FIG. 3, in block 310, the visual representation 101 of the robot path is overlapped on the visual representation 201 of the workpiece 200. In some embodiments, to obtain a better tuning effect, the visual representation 101 of the robot path may be aligned with the visual representation 201 of the workpiece 200. For example, in some embodiments, to align the visual representation 101 of the robot path with the visual representation 201 of the workpiece 200, a reference feature 103 may be provided.

Specifically, to overlap the visual representation 101 of the robot path on the visual representation 201 of the workpiece 200, a reference feature 103 for the robot path and a corresponding reference feature 202 for the visual representation 201 of the workpiece 200 may be identified. After that, the visual representation 101 of the robot path and the visual representation 201 of the workpiece 200 may be aligned with each other based on the reference feature 103 and the corresponding reference feature 202.

Regarding the workpiece 200, the corresponding reference feature 202 thereof may be one or more portions arranged on or nearby the workpiece 200 that can indicate a position of the workpiece 200. For example, as shown in FIGS. 1 and 2, in some embodiments, the reference feature 202 for the workpiece 200 may be a plurality of inherent portions such as holes arranged in the workpiece 200. By means of the inherent portions, the position of the workpiece 200 can be determined. In some alternative embodiments, the reference feature 202 for the workpiece 200 may also be an inherent portion along with a feature dot or object such as a reference block arranged nearby the workpiece 200. By means of the inherent portion and the feature dot or object, the position of the workpiece 200 can be determined as well. Regarding the reference feature 103 for the robot path, there may be one or more feature points arranged corresponding to the reference feature 202 for the workpiece 200, as mentioned above.

In some embodiments, besides one or more portions arranged on or nearby the workpiece 200 for indicating the position, the reference feature 103 may also comprise an orientation of the visual representation 101 of the robot path or the workpiece 200. In geometry, the orientation of an object such as a line, plane or rigid body is part of the description of how it is placed in the space it occupies. The position and orientation together fully describe how the object is placed in space. Typically, the orientation is given relative to a frame of reference, usually specified by a Cartesian coordinate system.

With the reference features comprising the position and the orientation, the visual representation 101 of the robot path and the visual representation 201 of the workpiece 200 can be aligned in terms of position and orientation. FIGS. 1 and 2 show examples where the visual representation 101 of the robot path and the visual representation 201 of the workpiece 200 have been aligned with each other by means of the reference features 103, 202. It can be seen from FIGS. 1 and 2 that when an orientation of the workpiece 200 in the visual representation is changed, the orientation of the visual representation 101 of the robot path is also adjusted to follow the orientation of the workpiece 200 in the visual representation. The same is applied to changes in the position of the visual representation 201 of the workpiece 200. That is, in some embodiments, the method may further comprise detecting a change in any of a position and an orientation of the visual representation 201 of the workpiece 200. In response to the change being detected, the visual representation 101 of the robot path may be adjusted based on the detected change accordingly. In this way, this method is more conducive to choosing the orientation that facilitates the tuning of the machining process.

For example, in some embodiments, assuming that deviations of the 3D model and the actual shape of the workpiece 200 are mainly concentrated on sides of the workpiece 200, which is easier to observe through the orientation shown in FIG. 1. In this event, the orientation of the workpiece 200 in the visual representation may be selected as the reference feature 202. The visual representation 101 of the robot path can then be displayed in an orientation following the orientation of the visual representation 201 of the workpiece 200. In this way, deviations of the machining process due to the deviations of the 3D model and the actual shape of the workpiece 200 as shown in the visual representation may be easily removed or eliminated.

After the visual representation 101 of the robot path is overlapped on the visual representation 201 of the workpiece 200, at block 320, in response to receiving a user input for moving a virtual point 102 in the at least one virtual point relative to the visual representation 201 of the workpiece 200, the computing assembly 850 detects an updated position of the virtual point 102 caused by the user input.

In some embodiments, the user input may comprise a positioning operation for positioning the virtual point 102 to be moved or adjusted. For example, in some embodiments, by wearing the AR device, one or more fingers of the operator may be used for positioning or moving the virtual point 102 according to a moving distance and/or direction of the virtual point 102. For example, when the operator's finger moves, a sensor such as a camera will capture positions of the finger on the AR device in real time. The controller may then cause the selected point to be moved according to the captured positions. Therefore, it seems the selected point moves along with the finger. When the selected point is moved to a current robot path, the operator may use another finger or another hand to perform some gestures to stop the moving process.

Alternatively or additionally, in some embodiments, when the finger moves, a virtual tool such as a cursor representing the finger shown in the displaying unit 840 will also move accordingly. That is, the cursor may be moved by moving the finger of the operator. When the cursor reaches the virtual point 102 to be adjusted, the operator may select or position the virtual point 102, for example, by tapping his finger twice. In this way, the virtual point 102 can be highlighted. That is, the computing assembly 850 can first highlight the virtual point 102 in response to detecting the user input for positioning or later moving the virtual point 102.

Alternatively or additionally, in some embodiments, instead of using his finger, the operator may also move a virtual tool such as a cursor shown in the displaying unit 840 to select or position the virtual point 102 by using a mouse. It is to be understood that the above embodiments where the virtual point 102 may be selected or positioned by the positioning operation input by the positioning device or the mouse are merely for illustrative purposes, without suggesting any limitation as to the scope of the present disclosure. Any other suitable means or approaches are also possible. For example, in some alternative embodiments, the positioning operation may also be input by a touch device, a voice recognition device or a sensor. That is, the positioning operation may comprise at least one of a pointing operation, a click operation, a drag operation, a scroll operation via a pointing device, a touch operation via a touch device, a voice command operation via a voice recognition device, a gesture operation or a body posture operation via a sensor.

In some embodiments, the selected or positioned virtual point 102 may be highlighted by changing their sizes and/or colors. Alternatively or additionally, in some embodiments, it is also possible to highlight the positioned virtual point 102 by flashing it. Of course, it is to be understood that the above methods of highlighting the positioned virtual point 102 as mentioned above are merely for illustrative purposes, without suggesting any limitation as to the scope of the present disclosure. Any other suitable methods or approaches are possible. For example, in some embodiments, the positioned virtual point 102 may also be highlighted by changing its shape.

After the virtual point 102 where the positions need to be adjusted are positioned, the operator may indicate that the positioning operation has been completed, for example, by tapping the finger multiple times or tapping a button such as a "Finish" button. That is, in some embodiments, if multiple tapping of the finger or tapping the completion button is detected, the computing assembly 850 may determine that the operator has selected one or more dots to be adjusted. After that, an operator is ready to tune the robot path.

Specifically, the selected virtual point 102 can be moved in response to a moving operation of the user input indicating a movement of the selected virtual point 102. Similar to the positioning operation, the moving operation may also comprise at least one of a pointing operation, a click operation, a drag operation, a scroll operation via a pointing device, a touch operation via a touch device, a voice command operation via a voice recognition device, a gesture operation or a body posture operation via a sensor.

For example, the operator may move the selected virtual point 102 by providing the virtual tool as mentioned above. In some embodiments, the operator may also move the selected virtual point 102 by moving a mouse. For example, FIGS. 1 and 2 show that the virtual point 102 deviates from the actual robot path to be processed, for example, due to deviation between the 3D model and the actual shape of the workpiece 200. In this event, by the moving operation, the virtual point 102 can be moved to the actual path to be processed to eliminate the deviation.

To prevent the movement of the selected object from causing possible collision or interference between the machining tool and the workpiece 200 during subsequent processing, in some embodiments, a threshold range for the movement of the selected virtual point 102 may be introduced. For example, after moving a certain distance, the selected virtual point 102 is at a new position, i.e., the updated position, where the machining tool would start to overcut the workpiece 200. Thus, to prevent the overcutting, the moving distance of the selected virtual point 102 towards the visual representation 201 of the workpiece 200 should not be larger than the certain distance as mentioned above, which may be a maximum value of the threshold range.

Thus, to prevent possible collision or interference between the machining tool and the workpiece 200, the updated position of the virtual point 102 by the movement may be determined to determine if the distance of the movement is within the threshold range. For example, if the moving distance towards the real-time representation is determined to be within the threshold range, which means that the movement is reasonable and the overcut will not occur, the selected virtual point 102 can then be moved the moving distance in the moving direction, and thus the updated position of the virtual position can be confirmed. After the updated position of the virtual position is confirmed, the visual representation 101 of the robot path may be updated based on the confirmed updated position of the virtual point 102. If it is determined that the moving distance towards the visual representation 201 of the workpiece 200 exceeds the threshold range, which means that the overcut may occur, the selected virtual point 102 can then be returned to the original position or moved the maximum distance indicated by the threshold range. That is, the updated position of the virtual point 102 is rejected. In the meantime, an alarm may be generated to inform the operator about the possible overcut. The alarm may include but is not limited to a sound alarm, a light alarm or a flashing alarm. For example, the virtual point may continuously flash to indicate that it has not moved successfully because it exceeds the threshold range.

It is to be understood that the movement of the selected virtual point 102 causing possible overcut, collision or interference refers to situations where the selected virtual point 102 is moved towards the visual representation 201 of the workpiece 200. If the determined moving direction is away from the visual representation 201 of the workpiece 200, the moving distance also should be within a threshold range to avoid excessive errors. For the two opposite directions, i.e., the directions away from or towards the visual representation 201 of the workpiece 200, the threshold ranges for the moving distances may be separately defined to further improve the machining accuracy while preventing possible overcut, collision or interference.

As mentioned above, the moving distance and direction may be determined based on the moving operation. For example, in some embodiments, in a case where the selected virtual point 102 is moved by moving the virtual tool, such as a cursor controlled by a mouse, the selected virtual point 102 can move with the cursor in real time. That is, the visual representation 101 of the robot path may be updated in real time based on the updated positions of the virtual point 102 moving with the virtual tool. In this case, the computing assembly 850 may determine whether the moving distance of the virtual point 102 exceeds the threshold ranges and performs corresponding actions according to the method mentioned above. In this way, the movement of the selected virtual point 102 can be more intuitive.

In some embodiments, the moving speed of the selected virtual point 102 moving towards the updated position may also be variable. In this way, more precise tuning can be obtained. In some embodiments, the moving speed may be adjusted from the moving operation. For example, in some embodiments where the selected virtual point 102 moves with the virtual tool such as a cursor in real time, the moving speed may be determined according to the distance between the virtual tool and the selected virtual point 102 during the moving operation. For example, in a case where the selected virtual point 102 is moved by a finger of an operator wearing an AR device, if the required moving distance of the virtual point 102 to the updated position is small, the operator may move his/her finger to thus move the cursor farther away from the selected virtual point 102, so that the selected virtual point 102 may be moved at a lower speed. If the required moving distance of the virtual point 102 to the updated position is large, the operator may move his/her finger to move the cursor closer to the selected virtual point 102, so that the selected virtual point 102 may be moved at a higher speed. When moving to the updated position of the selected virtual position, the operator may move his/her finger gradually away from the selected virtual position to thereby reduce the moving speed.

In some embodiments, a parameter panel may be displayed on the displaying unit 840 or an additional displayer separated from the displaying unit 840. The parameter shown in the parameter panel may at least comprise information about the coordinate value of the virtual point 102 and/or the minimum distance between the virtual point 102 and the visual representation 201 of the workpiece. When the virtual point 102 is moved, the coordinate value of the virtual point 102 and/or the distance between the virtual point 102 and the visual representation 201 of the workpiece may be changed accordingly. In this way, the operator may check if the movement of the virtual point 102 is within the threshold range or reasonable. Furthermore, in a case where the deviation between the virtual point 102 and the actual processing point is small, the operator may also change the parameter shown in the parameter panel directly. With the direct change in the parameter in the parameter panel, the position of the virtual point 102 may also be updated accordingly. That is, the updated position of the virtual point 102 may also be determined from an input operation of the at least one parameter in the parameter panel.

In some embodiments, the operator may indicate that the moving operation and/or the input operation have been completed for example by tapping the finger multiple times or tapping a button such as a "Finish" button. That is, if multiple tapping of the finger or tapping the completion button is detected, the controller may determine that the operator has moved the virtual point 102 in position. If there are other points that need to be adjusted, the operator can repeat the above positioning and moving operations until all the points that need to be adjusted are adjusted.

After that, at block 330, the robot path may be tuned based on the movement of the virtual point 102. For example, in some embodiments, tuning the robot path may comprise determining the updated position of the virtual point 102 by the movement. After that, an updated position of a controlling point in the at least one controlling point that corresponds to the virtual point 102 is obtained. Then the robot path can be tuned based on the updated position of the controlling point. After that, in some embodiments, the controller may directly generate the tuned instructions executable by the controller of the CNC machine tool or the robot.

It can be seen from the above that with the method and the apparatus 800 according to embodiments of the present disclosure, it is easier and more intuitive for the operator such as an on-site engineer to tune the machining process of the workpiece 200. In this way, the tuning efficiency and thus the machining efficiency can be enhanced and the machining quality can also be significantly improved.

The preceding paragraphs having described detailed steps of the method 300, in some embodiments of the present disclosure, the method 300 may be implemented by the computing assembly 850 of the apparatus 800 for tuning the robot path for processing the workpiece 200. FIG. 4 illustrates a schematic diagram of computing assembly 850 in accordance with embodiments of the present disclosure. As illustrated in FIG. 4, the computing assembly 850 comprises an overlapping unit 810 adapted to overlap a visual representation 101 of the robot path on a visual representation 201 of the workpiece 200, the visual representation 101 of the robot path comprising at least one virtual point that corresponds to at least one controlling point in the robot path; a detecting unit 820 adapted to, in response to receiving a user input for moving a virtual point 102 in the at least one virtual point relative to the visual representation 201 of the workpiece 200, detect a movement of the virtual point 102 caused by the user input; and a tuning unit 830 adapted to tune the robot path based on the movement of the virtual point 102.

In some embodiments, the overlapping unit 810 comprises: an identifying unit adapted to identify a reference feature 103 for the robot path and a corresponding reference feature 202 for the visual representation 201 of the workpiece 200, respectively; and an aligning unit adapted to align the visual representation of the robot path and the visual representation 201 of the workpiece 200 based on the reference feature 103 and the corresponding reference feature 202.

In some embodiments, the reference feature 103 comprises an orientation of the visual representation 101 of the robot path, and the corresponding reference feature 202 comprises an orientation of the visual representation 201 of the workpiece 200.

In some embodiments, the tuning unit 830 may comprise: a determining unit adapted to determine an updated position of the virtual point 102 by the movement; and an obtaining unit adapted to obtain an updated position of a controlling point, in the at least one controlling point, that corresponds to the virtual point 102 to tune the robot path based on the updated position of the controlling point.

In some embodiments, the apparatus 800 further comprises a highlighting unit adapted to, in response to detecting the user input for moving the virtual point 102 in the at least one virtual point 102, highlight the virtual point 102; and a virtual tool unit adapted to provide a virtual tool for moving the virtual point 102 according to any of a moving distance and a direction of the virtual point 102.

In some embodiments, the apparatus 800 further comprises an adjusting unit adapted to, in response to detecting a change in any of a position and an orientation of the visual representation 201 of the workpiece 200, adjust the visual representation 101 of the robot path based on the detected change.

In some embodiments, the determining unit is configured to: in response to a distance of the movement being within a threshold range, confirm the updated position; and in response to the distance exceeding the threshold range, reject the updated position.

In some embodiments, the determining unit is further configured to: determine, from a moving operation of the user input, a moving speed at which the virtual point 102 is to be moved; and determine the updated position of the virtual point 102 based on the moving speed; and wherein the apparatus 800 further comprises an updated unit adapted to update the visual representation 101 of the robot path based on the updated position of the virtual point 102.

In some embodiments, the visual representation 101 of the robot path comprises a visual representation that is displayed on any of a displayer and an augmented reality displayer; and wherein the visual representation 201 of the workpiece 200 comprises any of an image of the workpiece 200 displayed on the monitor and an image of the workpiece 200 observed through the augmented reality displaying unit 840.

In some embodiments, the apparatus 800 further comprises an instructing unit adapted to instruct the robot system to process the workpiece 200 by the tuned robot path.

In some embodiments of the present disclosure, a computer readable medium for turning a robot path for processing a workpiece 200 is provided. The computer readable medium has instructions stored thereon, and the instructions, when executed on at least one processor, may cause at least one processor to perform the method for turning a robot path for processing a workpiece 200 as described in the preceding paragraphs, and details will be omitted hereinafter.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to FIG. 3. Generally, program modules include routines, programs, libraries, objects, classes, components, data structures, or the like that perform particular tasks or implement particular abstract data types. The functionality of the program modules may be combined or split between program modules as ideal in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but is not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. On the other hand, various features that are described in the context of a single embodiment may also be implemented in multiple embodiments separately or in any suitable subcombination.

It should be appreciated that the above detailed embodiments of the present disclosure are only for exemplifying or explaining principles of the present disclosure and do not limit the present disclosure. Therefore, any modifications, equivalent alternatives and improvements, etc. without departing from the spirit and scope of the present disclosure shall be comprised in the scope of protection of the present disclosure. Meanwhile, appended claims of the present disclosure aim to cover all the variations and modifications falling under the scope and boundary of the claims or equivalents of the scope and boundary.

What is claimed is:
1. A method of tuning a robot path for processing a workpiece, comprising:
    overlapping a visual representation of the robot path on a visual representation of the workpiece, the visual representation of the robot path comprising at least one virtual point that corresponds to at least one controlling point in the robot path;
    wherein overlapping the visual representation of the robot path on the visual representation of the workpiece comprises:
        identifying a first reference feature for the robot path;
        identifying a second reference feature corresponding to the first reference feature for the visual representation of the workpiece; and aligning the visual representation of the robot path and the visual representation of the workpiece based on the first reference feature and the second reference feature;

in response to receiving a user input for moving a virtual point in the at least one virtual point relative to the visual representation of the workpiece, detecting an updated position of the virtual point caused by the user input;

tuning the robot path based on the updated position of the virtual point;

determining a direction between the virtual point and the updated position of the virtual point;

using the first reference feature and the second reference feature to apply at least one permittable distance threshold based on the direction, wherein a first threshold of the at least one permittable distance threshold is applied if the direction is towards the visual representation of the workpiece and a second threshold of the at least one permittable distance threshold is applied if the direction is away from the visual representation of the workpiece, wherein the first threshold and the second threshold are different.

2. The method of claim 1, wherein the first reference feature comprises an orientation of the visual representation of the robot path, and the second reference feature comprises an orientation of the visual representation of the workpiece.

3. The method of claim 1, wherein the tuning the robot path comprises:

determining the updated position of the virtual point;

obtaining an updated position of a controlling point, in the at least one controlling point, that corresponds to the virtual point; and tuning the robot path based on the updated position of the controlling point.

4. The method of claim 3, further comprising:

in response to detecting the user input for moving the virtual point in the at least one virtual point, highlighting the virtual point; and providing a virtual tool for moving the virtual point according to any of a moving distance of the virtual point and a moving direction of the virtual point.

5. The method of claim 4, further comprising:

in response to detecting a change in any of a position of the visual representation of the workpiece and an orientation of the visual representation of the workpiece, adjusting the visual representation of the robot path based on the detected change.

6. The method of claim 3, wherein determining the updated position of the virtual point comprising any of:

in response to a moving distance of the virtual point being within the at least one permittable distance threshold, confirming the updated position; and in response to the distance exceeding the at least one permittable distance threshold, rejecting the updated position.

7. The method of claim 3, wherein determining the updated position of the virtual point comprises:

determining, from a moving operation of the user input, a moving speed at which the virtual point is to be moved; and determining the updated position of the virtual point based on the moving speed; and wherein the method further comprises:

updating the visual representation of the robot path based on the updated position of the virtual point.

8. The method of claim 3, wherein determining the updated position of the virtual point comprises:

determining, from an input operation of at least one parameter in a parameter panel, the updated position of the virtual point, and the at least one parameter comprising any of:

coordinate values of the virtual point; and a minimum distance between the virtual point and the visual representation of the workpiece.

9. The method of claim 1, wherein the visual representation of the robot path comprises a visual representation that is displayed on any of a displayer and an augmented reality displayer; and wherein the visual representation of the workpiece comprises any of an image of the workpiece displayed on the displayer and an image of the workpiece observed through the augmented reality displayer.

10. The method of claim 1, further comprising: instructing a robot system to process the workpiece by the tuned robot path.

11. A computer readable medium having instructions stored thereon, the instructions, when executed on at least one processor, cause the at least one processor to perform the method according to claim 1.

12. An apparatus for tuning a robot path for processing a workpiece, comprising:

a displaying unit adapted to at least display a visual representation of the robot path; and a computing unit comprising:

an overlapping unit adapted to overlap the visual representation of the robot path on a visual representation of the workpiece, the visual representation of the robot path comprising at least one virtual point that corresponds to at least one controlling point in the robot path;

wherein the overlapping unit comprises:

an identifying unit adapted to identify a first reference feature for the robot path and a second reference feature corresponding to the first reference feature for the visual representation of the workpiece; and an aligning unit adapted to align the visual representation of the robot path and the visual representation of the workpiece based on the first reference feature and the second reference feature;

a detecting unit adapted to, in response to receiving a user input for moving a virtual point in the at least one virtual point relative to the visual representation of the workpiece;

detect an updated position of the virtual point caused by the user input;

determine a direction between the virtual point and the updated position of the virtual point; and use the first reference feature and the second reference feature, apply at least one permittable distance threshold based on the direction, wherein a first threshold of the at least one permittable distance threshold is applied if the direction is towards the visual representation of the workpiece and a second threshold of the at least one permittable distance threshold is applied if the direction is away from the visual representation of the workpiece, wherein the first threshold and the second threshold are different; and a tuning unit adapted to tune the robot path based on the updated position of the virtual point.

13. The apparatus of claim 12, wherein the first reference feature comprises an orientation of the visual representation of the robot path, and the second reference feature comprises an orientation of the visual representation of the workpiece.

14. The apparatus of claim 12, wherein the tuning unit comprises:

a determining unit adapted to determine the updated position of the virtual point; and an obtaining unit adapted to obtain an updated position of a controlling point, in the at least one controlling point, that corresponds to the virtual point to tune the robot path based on the updated position of the controlling point.

15. The apparatus of claim 14, further comprising:

a highlighting unit adapted to, in response to detecting the user input for moving the virtual point in the at least one virtual point, highlight the virtual point; and a virtual tool unit adapted to provide a virtual tool for moving the virtual point according to any of a moving distance of the virtual point and a direction of the virtual point.

16. The apparatus of claim 15, further comprising:

an adjusting unit adapted to, in response to detecting a change in any of a position of the visual representation of the workpiece and an orientation of the visual representation of the workpiece, adjust the visual representation of the robot path based on the detected change.

17. The apparatus of claim 14, wherein the determining unit is configured to:

in response to a moving distance of the virtual point being within the at least one permittable distance threshold, confirm the updated position; and in response to the distance exceeding the at least one permittable distance threshold, reject the updated position.

18. The apparatus of claim 14, wherein the determining unit is further configured to:

determine, from a moving operation of the user input, a moving speed at which the virtual point is to be moved; and determine the updated position of the virtual point based on the moving speed; and wherein the apparatus further comprises an updated unit adapted to update the visual representation of the robot path based on the updated position of the virtual point.

19. The apparatus of claim 14, wherein the determining unit is further configured to:

determine, from an input operation of at least one parameter in a parameter panel, the updated position of the virtual point, and the at least one parameter comprising any of:

coordinate values of the virtual point; and a minimum distance between the virtual point and the visual representation of the workpiece.

20. The apparatus of claim 12, wherein the visual representation of the robot path comprises a visual representation that is displayed on any of a monitor and an augmented reality displayer; and wherein the visual representation of the workpiece comprises any of an image of the workpiece displayed on the monitor and an image of the workpiece observed through the augmented reality displayer.

21. The apparatus of claim 12, further comprising:

an instructing unit adapted to instruct a robot system to process the workpiece by the tuned robot path.

* * * * *